June 24, 1930.  D. W. WADSWORTH  1,768,276
FRUIT AND VEGETABLE PACKING MACHINE
Filed Sept. 23, 1927  3 Sheets-Sheet 1
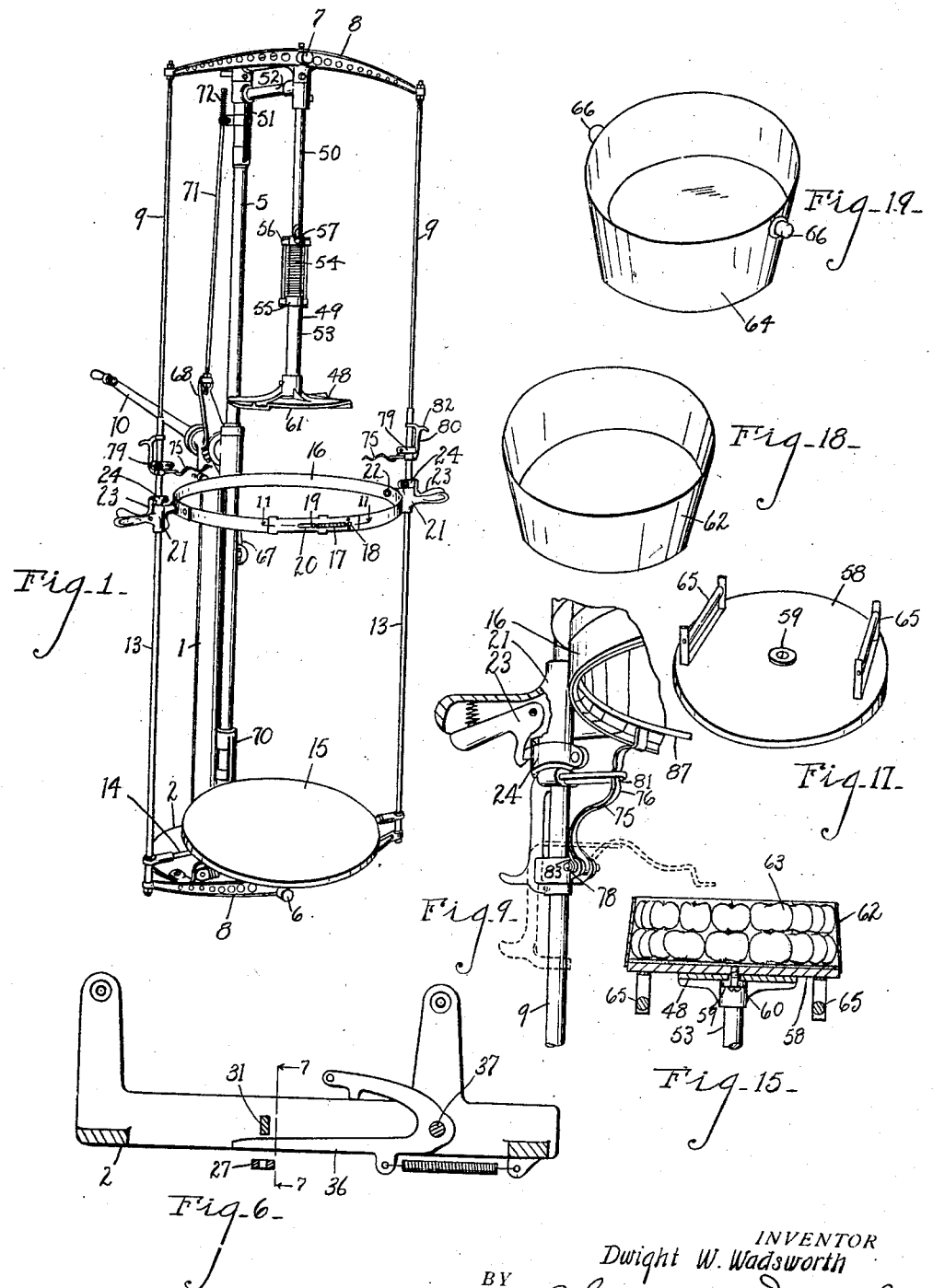
INVENTOR
Dwight W. Wadsworth
BY Chappell Earl
ATTORNEYS

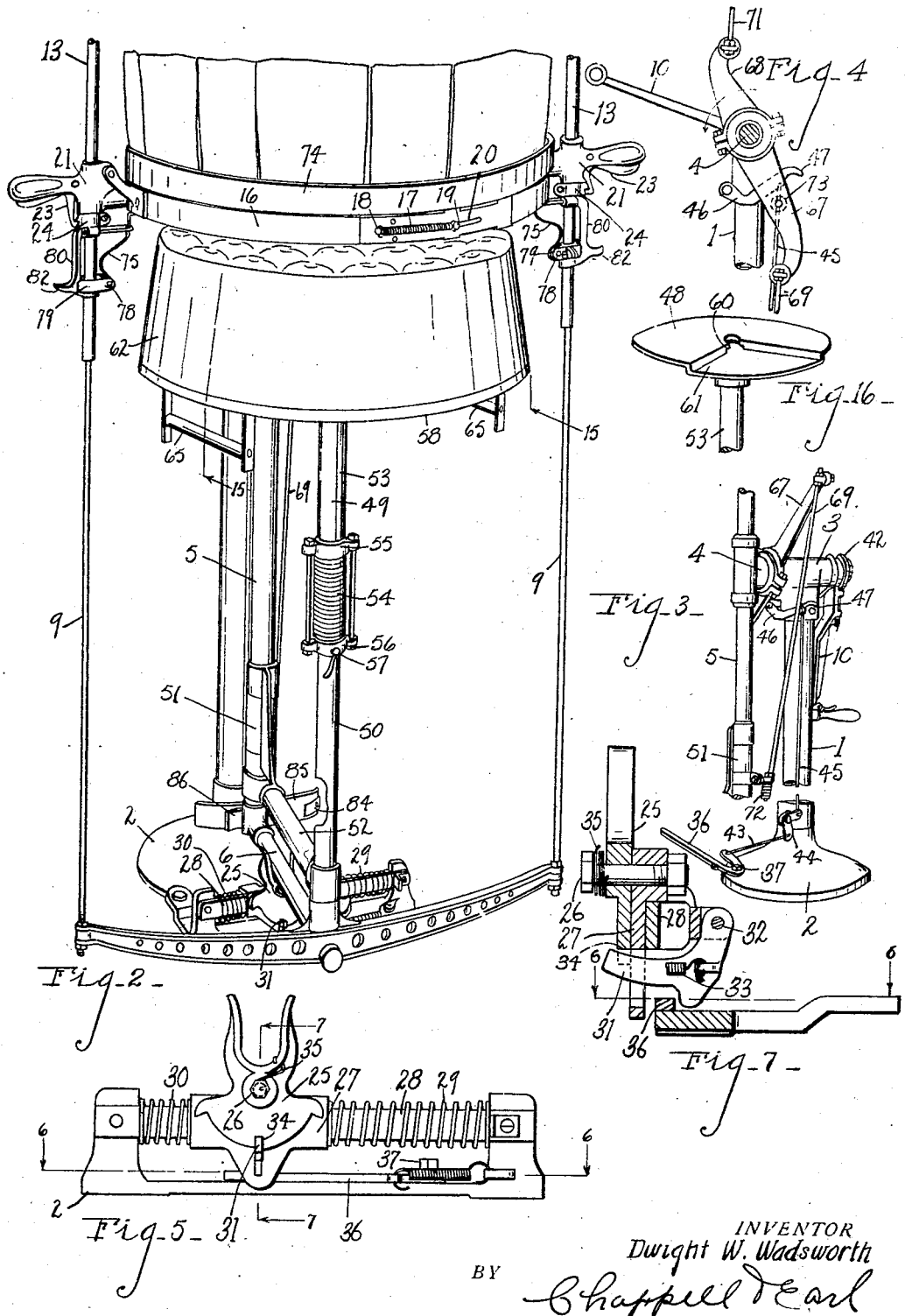

June 24, 1930.  D. W. WADSWORTH  1,768,276
FRUIT AND VEGETABLE PACKING MACHINE
Filed Sept. 23, 1927   3 Sheets-Sheet 3
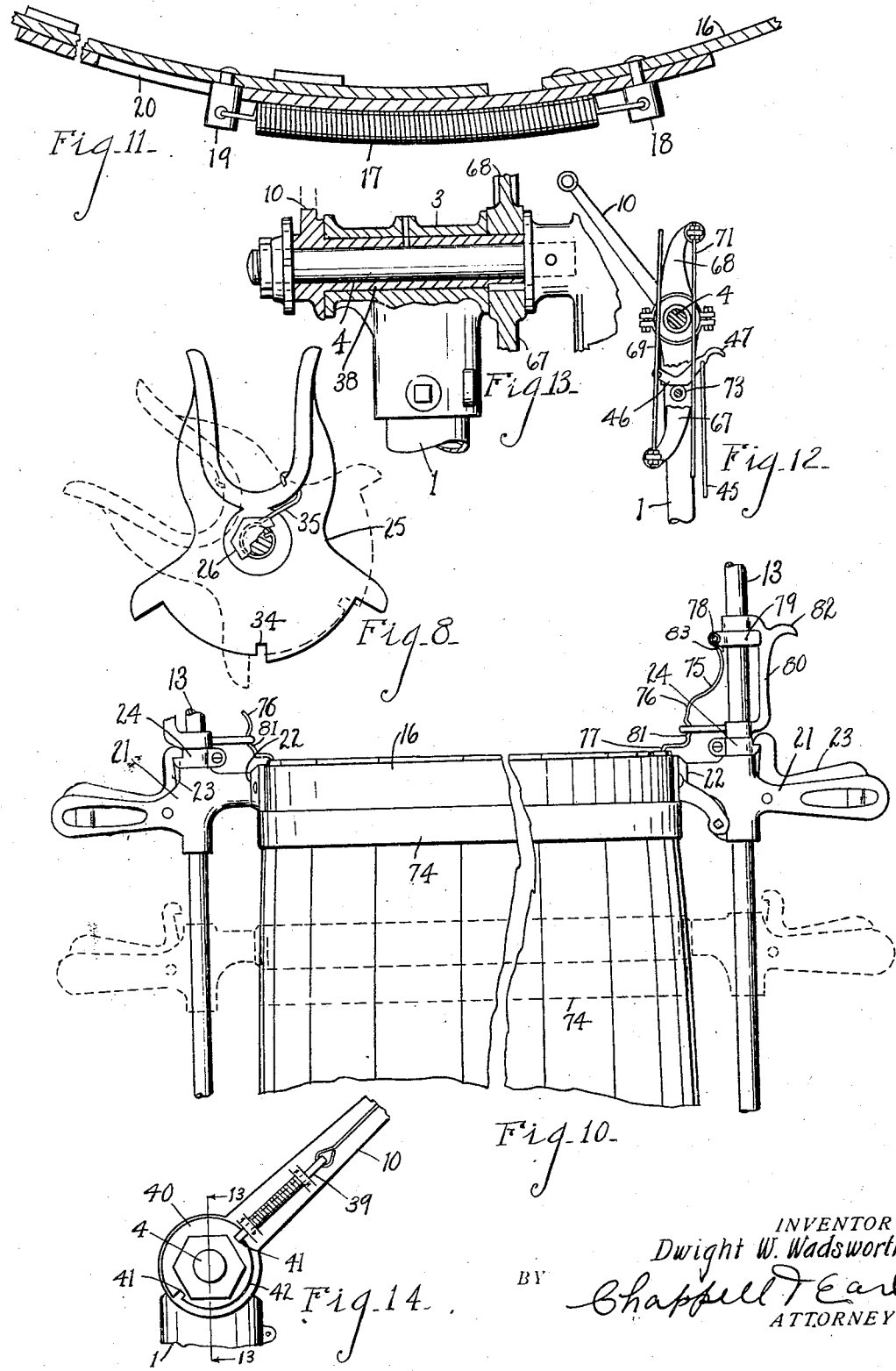
INVENTOR
Dwight W. Wadsworth
BY Chappell & Earl
ATTORNEYS Patented June 24, 1930

1,768,276

UNITED STATES PATENT OFFICE

DWIGHT W. WADSWORTH, OF FENNVILLE, MICHIGAN

FRUIT AND VEGETABLE PACKING MACHINE

Application filed September 23, 1927. Serial No. 221,540.

My present improvements relate particularly to the type of machine shown in my Patent No. 1,514,882 dated November 11, 1924, the same being an adaptation of and in some respects an improvement upon the structure of that patent.

The main objects of my present invention are:

First, to provide an improved packing machine by means of which a facing layer of fruit or vegetables may be effectively arranged in the end of a barrel.

Second, to provide a machine of this character which may be rapidly and easily manipulated and at the same time one which is not likely to injure the fruit.

Objects pertaining to details and economies of my invention will appear from the description to follow. The invention is defined in the claims.

A structure embodying my improvements is clearly illustrated in the accompanying drawing, in which:

Fig. 1 is a front perspective view of a packing machine embodying the features of my invention, the same being shown in position to receive the barrel.

Fig. 2 is a fragmentary perspective view illustrating the parts in reversed position from that shown in Fig. 1 with a barrel mounted in the machine and with a facing of fruit in position for the lowering of the barrel over the same.

Fig. 3 is a fragmentary perspective view showing details of the operating mechanism.

Fig. 4 is a fragmentary perspective view illustrating further details of the operating mechanism.

Fig. 5 is a fragmentary front elevation showing details of the stop means for the swinging parts.

Fig. 6 is a fragmentary horizontal section on line 6—6 of Figs. 5 and 7.

Fig. 7 is a detail vertical section on line 7—7 of Figs. 5 and 6.

Fig. 8 is a fragmentary elevation of parts shown in Fig. 5, the stops being shown in receiving position by dotted lines and in locking position by full lines.

Fig. 9 is a detail perspective view of the barrel supporting means.

Fig. 10 is a fragmentary side elevation of the barrel supporting means, this being shown in dotted position to illustrate its manipulation for the setting of a hoop.

Fig. 11 is an enlarged detail horizontal section through the barrel supporting hoop on line 11—11 of Fig. 1.

Fig. 12 is a detail view showing the position of the crank when the facing support is elevated into the barrel.

Fig. 13 is a detail view partially in vertical section on line 13—13 of Fig. 14 showing details of the frame supporting spindle.

Fig. 14 is a fragmentary elevation looking from the right of Fig. 13.

Fig. 15 is a fragmentary view partially in vertical section showing details of the facing tray and its support.

Fig. 16 is a detail perspective view of the facing tray support.

Fig. 17 is an inverted view of the tray.

Fig. 18 is a perspective view of the facing retainer or collar.

Fig. 19 is a perspective view of the facing receptacle.

Referring to the drawing, the main supporting pedestal 1 is provided with a suitable base 2 and carries a bearing 3 for the spindle 4 of the main frame of the machine which is mounted for rotative movement. This main frame comprises a supporting bar 5 mounted on the spindle and provided with forwardly projecting arms 6 and 7. On the outer or front ends of these arms are cross pieces 8 connected at their outer ends by the slide rods 9, these parts forming a rigid frame carried by the spindle.

The spindle 4 is directly mounted for rotation in a sleeve 38 provided with a crank 10. This crank 10 carries a pawl 39 which coacts with the disk 40 on the end of the spindle. This disk 40 has opposed recesses 41 adapted to receive the pawl 39. The disk has a reduced portion 42 at one side, the purpose of which will appear as the description proceeds.

The barrel support consists of a pair of sleeves 13 slidable on the rods 9 and carrying at their lower ends a cross piece 14 on which is mounted the base 15. This base is tiltably supported as described in my above mentioned letters patent.

The barrel supporting hoop 16 which is a split hoop is provided with overlapping telescoping ends provided with a tension spring 17 which permits the hoop accommodating itself to the variations in the barrel dimensions. The spring 17 is connected to one overlapping part at 18 and to the other at 19. A slot 20 is formed in one overlapping end to permit the pin to project therethrough.

The hoop 16 is pivoted at 22 on the slides 21 thereby allowing the hoop to be tilted so that when a barrel is arranged on the base 15 the barrel may be swung under the hoop and the hoop tilted down to embrace the barrel. The hoop supporting slides 21 are provided with latches 23 coacting with the keepers 24 which are adjustably mounted on the slides 13, the keepers being adjusted according to the length of the barrels.

To support the frame and to provide a shock absorber therefor I provide a resiliently supported forked stop 25 which is pivoted at 26 on a slide 27 supported on the rod 28 between the springs 29 and 30. This stop is shown in upright position in Fig. 5, or in position to engage one of the arms 6 of the frame, in which position it is held by means of the latch 31 which is pivoted at 32 on the slide 27 and held yieldingly in engaging position by the spring 33, the stop being notched at 34 to receive the latch. When the latch is released and the frame disengaged therefrom, the stop is swung into receiving position by means of the coiled spring 35, see dotted position in Fig. 8. The latch is released by the trip lever 36 which is pivoted at 37 on the base to coact with the latch.

This trip lever 36 is connected by a link 43 to a bell crank lever 44 pivoted on the pedestal 1, one arm of the bell crank lever 44 being connected by the link 45 to an actuating lever 46 which is provided with a hand hold 47, see Fig. 12. After the barrel has been placed upon the base 15 the operator disengages the trip lever by means of the actuating lever 46, and, the crank 10 being connected to the spindle 4 through the pawl or dog 39, the whole frame may be swung as a unit to bring the barrel to inverted position and the tray supporting head 48 carried by the arm 49 in upright position or in position to receive a tray.

This supporting arm 49 is made up of a section 50 mounted on the slide 51 having a bracket arm 52 projecting therefrom. The section 53 of the arm 49 telescopes with the section 50 a spring 54 being operatively connected to these sections by means of the thrust collar 55 on the section 53 and the thrust collar 56 on the section 50, the thrust collar 56 being adjustably secured to the section 50 by means of the set screw 57.

The tray supporting head 48 is adapted to receive a tray 58 which is provided with a centrally disposed headed stud 59 adapted to engage in the undercut central recess 60 in the head. A guiding segmental recess 61 is provided in the head to assist in engaging the stud 59 with this undercut recess 60. The purpose of the undercut recess is to secure the tray so that it is not likely to become dislocated during manipulation of the machine, and at the same time the tray may be readily engaged and disengaged.

The tray 58 is adapted to receive an open ended conical facing support 62 shown in Fig. 15. In practice the fruit or articles packed, indicated at 63 in Fig. 15, are arranged within a facing receptacle 64 which is of a suitable size to receive the facing holder 62. The facing holder is arranged within the receptacle and a facing of the articles to be packed is arranged within the holder.

The tray 58 is then arranged on the top of the packed articles while still within the facing receptacle, the tray and receptacle inverted and placed as a unit upon a suitable bench or table.

The facing receptacle 64 may be grasped by the handles 66 and lifted, leaving the arranged facing material supported upon the tray 58 embraced by the facing holder 62 and the tray resting on its handles 65 as legs. The tray is then lifted as a complete facing unit and placed upon the tray supporting head 48. The dog or pawl 39 is then disengaged from the notch 41 with which it may be engaged, which allows the crank to be rotated through the reduced segment 42 of the disk without rotating the spindle 4 to which the main frame is attached.

The sleeve 38 of the crank is provided with cross arms or crank arms 67 and 68, the arm 67 being connected by a link 69 to the slide 70 carrying the base 15. The arm 68 is connected by the link 71 to the slide 51 carrying the tray supporting head. The link 71 is connected to the slide 51 through the springs 72 so that undue pressure is not applied to the facing. The spring 54 also acts to prevent crushing of the fruit or articles packed.

As the crank is rotated through one-half its stroke the tray is moved into the barrel with the facing in engagement with the bottom of the barrel. When the half revolution of the crank is completed the pawl 39, as stated, engages the second notch 41 and at the same time the actuating lever 46 for the trip lever is engaged by the tappet roller 73, see Fig. 12, which released the trip lever so that continued movement of the crank 10 swings the entire frame, bringing the barrel again to upright position. The pawl 39 is then released and the crank rotated backward to withdraw the tray supporting head from the barrel.

Ordinarily, before placing the barrel upon the base 15 the top hoops are removed and the quarter hoop 74 of the barrel is slipped upwardly to permit the expansion of the end of the barrel so that the facing holder 62 may enter therein. This holder, which is formed of heavy paper or card board, is a comparatively close fit when disposed within the barrel adjacent its head. It is therefore necessary to expand the end of the barrel to receive this holder.

Before removing the barrel the hoop 74 is preferably forced down to its normal position shown by dotted lines in Fig. 10, thus preventing the staves of the barrel from being distorted in handling. This I accomplish by use of the barrel supporting hoop 16 as a setting means, the latch 23 being disengaged from the keeper 24 and the hoop 74 forced downwardly as shown by dotted lines in Fig. 10.

To support the barrel during the manipulation of the machine, I provide a pair of retaining fingers 75 which are formed of spring material and have cam portions 76 adjacent their engaging ends 77. These fingers are pivoted at 78 on collars 79 mounted on the slides 13, see Figs. 1, 2 and 10. These fingers are shifted to and held in engaging position by means of the actuating slides 80 which carry loops 81 embracing the fingers and coacting with the cams 76 thereof to force them into clamping engagement with the barrel. The slides are provided with finger pieces 82 so that they may be lifted upwardly, releasing the fingers which are thrown to disengaging position by means of the coiled springs indicated at 83 on the pivots 78. These clamping fingers 75 are engaged merely by pushing downwardly on the slides and disengaged by an upward pull thereon, thus permitting rapid manipulation.

It should be pointed out that these fingers 75 are engaged prior to the inverting of the frame after the barrel has been mounted on the base 15, and they are disengaged prior to the driving down of the quarter hoop by means of bands 16.

In practice I provide a plurality of trays 58 and a plurality of facing receptacles 64. The facing holders 62, of course, are left within the barrel so that it is necessary to provide a facing holder for each barrel packed.

To prevent the swinging of the frame in a reverse direction I provide a spring detent 84 which is mounted on the guide 85 to coact with a shoe 86. The shoe passes over this detent on the forward movement of the frame but springs up to prevent rearward movement of the frame which might subject the parts to undue strain.

It will be noted that the lever arms 67 and 68, see Fig. 12, are of different lengths, the purpose of this being to counteract the unbalanced condition resulting from the weight of a barrel and the facing therein relative to rotation of the center of the frame. Also, the weight of the inverted barrel on the long lever facilitates the raising of the tray containing the facing operated by the short lever. In other words, the weight of the barrel on the long lever acts as a counterweight for the weight of the facing unit through the short lever. These levers are proportioned so that when the machine is in an approximately horizontal position the parts are substantially balanced.

In the event that the staves of the barrel are inclined to fall in or become displaced after the top hoops have been removed and its quarter hoop loosened preliminary to packing, I provide a supporting ring 87 which is adapted to be slipped into the chime of the barrel as indicated in Fig. 9. This ring 87 should be removed before an attempt is made to reset the hoop 74. The ring prevents the staves from swinging out of position which might result in their engaging the facing holder 62 as the barrel is telescoped over the holder.

While my improved machine embodies the main features or principles of my said patent, it contains numerous improvement which I consider of substantial advantage. The structure is rapidly and easily manipulated and very greatly facilitates the packing of fruits and vegetables, the facing being supported so that it does not become displaced in the complete filling of the barrel.

Having thus described my invention what I claim as new and desire to secure by Letters Patent is:

1. In a structure of the class described, the combination of a frame provided with a spindle whereby it is rotatably supported, a barrel support slidably mounted on said frame, a tray support slidably mounted on said frame in opposed relation to said barrel support, a sleeve shaft concentric with said spindle and provided with a crank, arms on said shaft connected to said barrel and tray supports, manually controlled means for connecting said crank to said spindle, a yieldingly supported stop for said frame, a pivoted latch for said stop, a trip lever for said latch, and means for actuating said trip lever comprising an actuating lever operatively connected to said trip lever and adapted to be manually released, one of said arms being provided with a tappet coacting with said actuating lever to automatically disengage said latch to permit the swinging of the frame after said slides have been actuated to position the tray in the barrel.

2. In a structure of the class described, the combination of a frame provided with a spindle whereby it is rotatably supported, a barrel support slidably mounted on said frame, a tray support slidably mounted on said frame in opposed relation to said barrel support, a sleeve shaft concentric with said spindle and provided with a crank, arms on said shaft connected to said barrel and tray supports, manually controlled means for connecting said crank to said spindle, a stop for said frame, a latch for said stop, a trip lever for said latch, and means for actuating said trip lever comprising an actuating lever operatively connected to said trip lever and adapted to be manually released, one of said arms being provided with a tappet coacting with said actuating lever to automatically disengage said latch to permit the swinging of the frame after said slides have been actuated to position the tray in the barrel.

3. In a structure of the class described, the combination of a rotatably supported frame, a barrel support slidably mounted on said frame, a tray support slidably mounted on said frame in opposed relation to said barrel support, a crank, arms on said crank connected to said barrel and tray supports, means for connecting said crank to said frame permitting the independent operation of the crank to actuate said arms, a stop for said frame provided with locking means, and means for releasing said stop comprising an actuating lever adapted to be manually released, one of said arms being provided with a tappet adapted to automatically disengage said latch to permit the swinging of the frame after said supports have been actuated to position the tray in the barrel.

4. In a structure of the class described, the combination of a rotatably supported frame, a barrel support slidably mounted on said frame, a tray support slidably mounted on said frame in opposed relation to said barrel support, a crank, arms on said crank connected to said barrel and tray supports, said arms being of different lengths, means for connecting said crank to said frame permitting the independent operation of the crank to actuate said arms, a stop for said frame provided with locking means, and means for releasing said stop.

5. In a structure of the class described, the combination of a rotatably supported frame, a barrel support slidably mounted on said frame, a tray support slidably mounted on said frame in opposed relation to said barrel support, a crank, arms on said crank connected to said barrel and tray supports, said arms being of different lengths, means for connecting said crank to said frame permitting the independent operation of said crank to actuate said arms, locking means for said frame, and means for releasing said locking means operatively associated with said crank to permit the swinging of the frame after said supports have been actuated to position the tray in the barrel.

6. In a structure of the class described, the combination of a pedestal, a frame comprising a supporting bar provided with a spindle and having forwardly projecting arms at its ends provided with cross pieces, slide rods carried by said cross pieces, a barrel support comprising a slide mounted on said supporting bar, sleeves mounted on said slide rods and operatively connected to said slide, a barrel support carried by said slide, a barrel supporting band, supporting brackets for said band mounted on said sleeves and provided with latches, keepers mounted on said sleeves to coact with said latches, barrel clamping fingers pivotally mounted on said sleeves, said fingers being cammed, and actuating members slidably mounted on said sleeves to slidably engage said fingers.

7. In a structure of the class described, the combination of a pedestal, a frame comprising a supporting bar provided with a spindle and having forwardly projecting arms at its ends provided with cross pieces, slide rods carried by said cross pieces, a barrel support comprising a slide mounted on said supporting bar, sleeves mounted on said slide rods and operatively connected to said slide, a barrel support carried by said slide, a barrel supporting band, supporting brackets for said band slidably mounted on said sleeves and provided with latches, and keepers mounted on said sleeves for adjustment independently of said brackets to coact with said latches.

8. In a structure of the class described, the combination of a pedestal, a frame comprising a supporting bar provided with a spindle and having forwardly projecting arms at its ends provided with cross pieces, slide rods carried by said cross pieces, a barrel support comprising a slide mounted on said supporting bar, sleeves mounted on said slide rods and operatively connected to said slide, a barrel support carried by said slide, a barrel supporting band, supporting brackets for said band slidably mounted on said sleeves, barrel clamping fingers pivotally mounted on said sleeves, said fingers being cammed, and actuating members slidably mounted on said sleeves to slidably engage said fingers.

9. In a structure of the class described, the combination of a tiltable barrel support slidably mounted on said frame, an expansible barrel supporting band provided with a retracting spring, slidably mounted supporting brackets on which said band is pivotally mounted, said supporting brackets being provided with hand pieces and with latches, keepers coacting with said latches to support said brackets in barrel engaging position, cammed pivotally mounted barrel clamping fingers, and slidably mounted actuating members provided with loops embracing said fingers whereby said fingers are moved to and retained in barrel clamping position.

10. In a structure of the class described, the combination of a tiltable barrel support slidably mounted on said frame, an expansible barrel supporting band provided with a retracting spring, slidably mounted supporting brackets on which said band is pivotally mounted, said supporting brackets being provided with hand pieces and with latches, and keepers mounted for adjustment independently of said brackets to coact with said latches to support said brackets in barrel engaging position.

11. In a structure of the class described, the combination of a tiltable barrel support slidably mounted on said frame, a barrel supporting band, slidably mounted supporting brackets on which said band is pivotally mounted, said supporting brackets being provided with hand pieces and with latches, keepers coacting with said latches to support said brackets in barrel engaging position, cammed pivotally mounted barrel clamping fingers, and slidably mounted actuating members provided with loops embracing said fingers whereby said fingers are moved to and retained in barrel clamping position.

12. In a structure of the class described, the combination of a pedestal, a frame rotatably mounted on said pedestal, a barrel support slidably mounted on said frame, an expansible barrel clamping band provided with a retracting spring, slidably mounted supporting brackets on which said band is pivotally mounted, barrel clamping fingers mounted for adjustment independently of said supporting brackets, actuating means for said clamping fingers, a tray support slidably mounted on said frame in opposed relation to said barrel, means for simultaneously actuating said tray and barrel supports whereby they are moved to and from each other, and means for rotating said frame.

13. In a structure of the class described, the combination of a pedestal, a frame rotatably mounted on said pedestal, a barrel support slidably mounted on said frame, a barrel clamping band, slidably mounted supporting brackets for said band, barrel clamping fingers mounted for adjustment independently of said supporting brackets, actuating means for said clamping fingers, a tray support slidably mounted on said frame in opposed relation to said barrel, means for simultaneously actuating said tray and barrel supports whereby they are moved to and from each other, and means for rotating said frame.

14. In a structure of the class described, the combination of a pedestal, a frame rotatably mounted on said pedestal, a barrel support slidably mounted on said frame, an expansible barrel clamping band provided with a retracting spring, slidably mounted supporting brackets on which said band is pivotally mounted, barrel clamping fingers mounted for adjustment independently of said supporting brackets, and actuating means for said clamping fingers.

15. In a structure of the class described, the combination of a pedestal, a frame rotatably mounted on said pedestal, a barrel support slidably mounted on said frame, a barrel clamping band, slidably mounted supporting brackets for said band, barrel clamping fingers mounted for adjustment independently of said supporting brackets, and actuating means for said clamping fingers.

16. In a structure of the class described, the combination of a barrel support, an expansible barrel clamping band provided with a retracting spring, slidably mounted supporting brackets for said band, barrel clamping fingers mounted for adjustment independently of said supporting brackets, and actuating slides for said clamping fingers.

17. In a structure of the class described, the combination of a barrel support, a barrel clamping band, slidably mounted supporting brackets for said band, barrel clamping fingers, and actuating slides for said clamping fingers.

18. In a structure of the class described, the combination of a tray supporting head having a segmental recess in the face thereof terminating in a central undercut opening, and a tray provided with a centrally disposed headed stud engageable and disengageable with said undercut opening with a transverse sliding movement.

19. In a structure of the class described, the combination of a rotatably supported frame, a barrel support slidably mounted on said frame, a tray support slidably mounted on said frame in opposed relation to said barrel support, a crank, arms on said crank connected to said barrel and tray supports, said arms being of different lengths providing a counterbalancing leverage for the parts, and means connecting said crank to said frame permitting independent operating connections for the crank to actuate said arms.

In witness whereof I have hereunto set my hand.

DWIGHT W. WADSWORTH.